US00RE34447E

United States Patent [19]

Poppe et al.

[11] E Patent Number: Re. 34,447

[45] Reissued Date of Patent: Nov. 16, 1993

[54] CRYSTALLINE POLYAMIDE COMPOSITION FROM DICARBOXYLIC ACID MIXTURE AND DIAMINE

[75] Inventors: Wassily Poppe, Lombard; Larry W. Autry, Lisle; Yu-Tsai Chen, Glen Ellyn; Joel A. Richardson, Naperville; David P. Sinclair, Winfield, all of Ill.

[73] Assignee: Amoco Corporation, Chicago, Ill.

[21] Appl. No.: 222,160

[22] Filed: Jul. 21, 1988

Related U.S. Patent Documents

Reissue of:

[64] Patent No.: 4,603,166
Issued: Jul. 29, 1986
Appl. No.: 699,813
Filed: Feb. 8, 1985

U.S. Applications:

[63] Continuation-in-part of Ser. No. 601,911, Apr. 19, 1984, abandoned, which is a continuation-in-part of Ser. No. 466,899, Feb. 16, 1983, abandoned.

[51] Int. Cl.[5] ..... C08L 77/06

[52] U.S. Cl. ..... 524/606; 524/607; 525/432; 528/339; 528/340; 528/347; 528/349

[58] Field of Search ..... 528/339, 340, 347, 349; 524/606, 607; 525/432

[56] References Cited

U.S. PATENT DOCUMENTS

| | | | |
|---|---|---|---|
| 3,551,548 | 12/1970 | Brignac et al. | 528/339 |
| 3,926,924 | 12/1975 | Edgar et al. | 528/339 |
| 4,238,603 | 12/1980 | Chapman et al. | 528/339 |
| 4,476,280 | 10/1984 | Poppe et al. | 528/339 |
| 4,603,166 | 7/1986 | Poppe et al. | 528/339 |

OTHER PUBLICATIONS

Journal of Polymer Science (JPS), vol. 42; pp. 249–257; 1960.

A. J. Yu, et al. "Isomorphous Replacement in Copolyamide Systems: Adipic and Terephthalic Acids" Journal Polymer Science v. 42 (1960) pp. 249–257.

D. Erickson "Plastic for the '90s Some Clever chemistry churns out a new polymer" Scientific American Nov., 1991, pp. 130–131.

*Primary Examiner*—Harold D. Anderson

*Attorney, Agent, or Firm*—Richard J. Schlott; Stephen L. Hensley; Frank J. Sroka

[57] ABSTRACT

Novel crystalline polyamides having high heat deflection temperatures when filled are prepared from aliphatic diamines and either mixtures of terephthalic acid and adipic acid or mixtures of terephthalic acid, isophthalic acid and adipic acid. The mole ratio of aliphatic diamine to terephthalic acid, isophthalic acid, and adipic acid is in the range of about 100:65–95:25–0:-35–5. The polyamides can be filled with about 10 to about 60 parts by weight of a filler. The mechanical properties of these polyamides are largely unaffected by absorbed water.

27 Claims, No Drawings

CRYSTALLINE POLYAMIDE COMPOSITION FROM DICARBOXYLIC ACID MIXTURE AND DIAMINE

Matter enclosed in heavy brackets [ ] appears in the original patent but forms no part of this reissue specification; matter printed in italics indicates the additions made by reissue.

BACKGROUND OF THE INVENTION

This is a continuation-in-part application of Ser. No. 601,911, filed Apr. 19, 1984, which was a continuation-in-part application of Ser. No. 466,899, filed Feb. 16, 1983, both abandoned.

FIELD OF THE INVENTION

The field of this invention relates to crystalline copolyamides or terpolyamides from aliphatic diamines (ADA), particularly hexamethylene diamine (HMDA), and either mixtures of terephthalic acid (TA) and adipic acid (AA), or mixtures of TA, isophthalic acid (IA), and AA.

Crystalline polyamides from ADA and mixtures of TA and AA or TA, IA, and AA, which are polymers of injection moldable quality have not been suggested or disclosed in the prior art. These polymers have several distinct advantages over known polyamides. Filled compositions from ADA and TA, AA and ADA, and TA, IA, and AA having heat deflection temperatures in excess of about 245° C. (473° F.) are unknown in the prior art. Also, unlike conventional polyamides such as Nylon 6 and Nylon 6,6, the mechanical properties of the polyamide compositions of the present invention are largely unaffected by moisture absorbed from the atmosphere during the course of normal use.

References of interest include U.S. Pat. No. 3,553,288, which discloses polyester blends, some components of which can be TA, IA or AA. U.S. Pat. No. 4,218,509 discloses various fibers. Transparent terpolyamides from TA, IA, AA and HMDA moieties are disclosed in Japanese Patent No. J7021116. British Patent Application No. 604/49 discloses isomorphous TA, AA-HMDA polyamides; German Offenlegungschrift No. 2,651,534 discloses fiber-forming random terpolyamides including TA and IA and very small amounts of AA with HMDA; Japanese Kokai Nos. J71018809, J52085516 and J7102818 disclose fibers from TA, IA, AA and HMDA polyamides. Other references include U.S. Pat. No. 3,551,548 which discloses amorphous polyamides, U.S. Pat. No. 3,526,524 which relates to copolyamides from adipic acid and U.S. Pat. No. 4,238,603 which relates to amorphous fibers which can be crystallized after the amorphous fiber is heat treated at temperatures above the glass transition temperature. It is clear from a review of these references that crystalline polayamides manufactured from ADA and mixtures of TA and AA, or mixtures of TA, IA, and AA, including filled compositions of these polymers, having heat deflection temperatures of at least about 245° C., a molecular weight of about 5,000 to about 60,000, and tensile strengths of about 20,000 psi to about 40,000 psi, which largely retain these properties even after reaching equilibrium with atmospheric moisture, have not been contemplated in the prior art.

The general object of this invention is to provide compositions of polyamides derived from ADA and mixtures of TA and AA, or from ADA and mixtures of TA, IA, and AA which can be reinforced with glass fibers, glass beads, minerals, or a mixture thereof.

Another object is to provide a resinous polyamide, which when filled with glass fibers has a heat deflection temperature above 245° C. (473° F.).

We have found that the objects of the instant invention can be accomplished with a resinous polyamide which comprises the following recurring units:

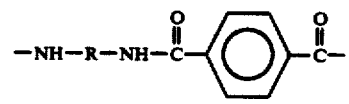

(A)

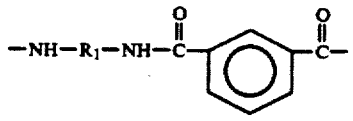

(B)

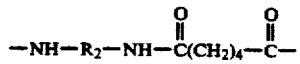

(C)

Wherein [the mole ratio of the dicarboxylic acid moieties in the A:B:C units is about 65–90:25–0:35–5, with the proviso that the mole ratio of the dicarboxylic acid moieties in the B:C units is less than 3:1, and wherein] R, $R_1$, and $R_2$ are, independently, divalent aliphatic hydrocarbyl radicals of 4 to 12 carbon atoms.

We have found that, when combined with fillers, polyamides obtained from ADA, particularly HMDA, with mixtures of TA, LA, and AA or ADA, particularly HMDA, with TA and AA provided surprisingly improved properties. The mole ratio range of ADA:TA:IA:AA is about 100:65–90:25–0:35–5. The preferred mole ratio of ADA:TA:IA:AA is in the range of about 100:65:25:10 to about 100:80:5:15. The preferred mole ratio range of ADA:TA:AA is about 100:65:35 to about 100:95:5. The crystalline polyamides, when filled and molded with glass fiber, [glass beads, minerals] or a mixture thereof have a beat deflection temperature in the range of about 245° C. to about 305° C., as determined by ASTM Method D648.

It is completely unexpected to obtain a heat deflection temperature above about 245° C. when the instant polyamides are glass filled. The prior art discloses compositions which have much lower glass filled heat deflection temperatures. U.S. Pat. No. 4,238,603 discloses compositions useful for forming fibers which have molar ratios of TA:IA:AA of 68–45:30–40:2–15. Our experimental results show that these compositions have glass filled heat deflection temperatures of only about 125° C. We have found, surprisingly, that by maintaining the TA:IA:AA and the TA:AA molar ratios within critical ranges, desirably high heat deflection temperatures can be obtained. This is an unusual feature and completely unexpected from the prior art since comparable polyamides have much lower heat deflection temperatures.

The importance of having high heat deflection temperatures is that it enables the injected molded polyamides to be used in applications such as the hood of an automobile, shroud for a lawn mower, chain saw guard, and in electrical connector applications. In addition to the high heat deflection temperature, the tensile strength of these polyamides is about 20,000 to about 40,000 psi which is as high or higher than that of die cast aluminum or zinc while the specific gravity of our polyamides is about one-half of that of aluminum or zinc. Thus, these polyamides are particularly useful in transportation equipment applications. These filled polyamides also have a flexural modulus in excess of about 1,000,000 to about 3,000,000 psi as determined by ASTM Method D790. This property is advantageous in applications requiring dimensional stability. The molecular weight of the instant polyamides is about 5,000 to about 40,000.

Aliphatic diamines useful in preparing the polyamides of the instant invention include alkylene, polymethylene, and cycloaliphatic diamines of 2 to 14 carbon atoms. Examples of preferred diamines include: trimethylhexamethylenediamine; ethylenediamine; tetramethylenediamine; octamethylenediamine; nonamethylenediamine; dodecamethylenediamine; 1,2-cyclohexanediamine; 1,3-cyclohexanediamine; 1,4-cyclohexanediamine; 1,3-bis(aminomethyl)cyclohexane; 1,4-bis(aminomethyl)cyclohexane; 3,3'-diamino(dicyclohexylmethane); 3,4'-diamino(dicyclohexylmethane); 4,4'-diamino(dicyclohexylmethane); 1,2-propanediamine; 1,3-propanediamine; 3-amino-1-methylaminopropane; 3-amino-1-cyclohexylaminopropane; hexamethylene diamine; and dodecamethylene diamine. Most preferred diamines are dexamethylene diamine and dodecamethylene diamine.

The polyamide composition of the instant invention can be filled with about 10 to about 60 weight percent glass fibers, glass beads, minerals, or a mixture thereof, or graphite fibers. Our studies have shown that high heat deflection temperatures and also the cost of molding products derived from copolyamides can be reduced by substituting for part of the polymer about 10 to about 60 weight percent thereof with glass fibers, glass beads, minerals, or graphite fibers. Advantageously, the molding composition can contain from about 20 to about 50 weight percent of glass fibers, glass beads, minerals, or a mixture thereof, or graphite fibers. These glass filled copolyamides are much more economical than molding compositions prepared without the use of the glass fibers, glass beads, minerals, or graphite fillers. The use of polyimides and amides as engineering plastics has been limited only by their relatively high cost. Thus, employing our invention, through which the inherent cost can be brought down, the commercial application of polyamides requiring very high flexural strength can be greatly expanded.

Besides being useful as injection molding resins, these novel materials can be used as the matrix in composite materials and as fibers. Further, these compositions may be advantageously blended with other polymers such as Nylon 6,6.

It is also possible to add to the polyamides of this invention various conventional additives, such as heat stabilizers, UV stabilizers, toughening agents, flame retardants, plasticizers, antioxidants, and pigments either before or after the polymerization as appropriate.

In the preparation of the instant polyamides, the processes can be divided into salt preparation, condensation, and polycondensation sections. The salt preparation section is most conveniently batch operation so that proper stoichiometry can be achieved. The condensation section can be batch or fully continuous operations. The product from the condensation section is a polyamide of intermediate conversion with an inherent viscosity (60/40 phenol/tetrachloroethane)(TCE) at 30° C. of about 0.1 to about 0.6 dl/g. This polymer is then finished to an inherent viscosity of about 0.8 dl/g or greater in a twin-screw extruder reactor. This finished polymer is then compounded with suitable filler materials. The preferred processes for preparation of these polyamides are presented herein below.

The addition of reinforcing materials improves the material properties of the blend, particularly the physical properties such as flexural strength, are improved if the polyamides contain from about 10 to about 60 percent by weight glass fibers, glass beads, minerals, or mixtures thereof. In the preferred range, the polyamides contain about 20 to about 50 percent by weight of glass fibers, glass beads, or graphite, or mixtures thereof. Suitably, the reinforcing materials can be glass fibers, glass beads, glass spheres, or glass fabrics. The preferred fillers are glass fibers. These are made of alkali-free, boron-silicate glass or alkali-containing C-glass. The thickness of the fibers is, on the average, between 3 microns and 30 microns. It is possible to use long fibers in the range of from 5 mm to 50 mm and also short fibers with each filament length of 0.05 mm to 5 mm. In principle, any standard commercial grade fiber, especially glass fibers, can be used. Glass beads ranging from 5 microns to 50 microns in diameter may also be used as a reinforcing material.

The glass fiber reinforced polyamide polymers can be prepared by any conventional method. Suitably, so-called roving endless glass fiber strands are coated with the polyamide melt and subsequently granulated. The cut fibers and glass beads can also be combined with granulated polyamides compositions and the resulting mixture melted in a conventional extruder. Alternatively, the fibers can be introduced into the molten polyamides through a suitable inlet in the extruder.

The injection molding of the instant polyamides is accomplished by injecting the polyamide into a mold maintained at a temperature of about 100° C. to about 200° C. In this process, a 20-second to 1-minute cycle is used with a barrel temperature of about 300° to about 350° C. These temperatures can vary depending on the Tg and Tm of the polyamide being molded. The instant copolyamide compositions have excellent heat deflection and other physical properties.

The following procedures and examples illustrate a preferred embodiment of this invention, It is understood that these procedures and examples are illustrative only and do not purport to be wholly definitive with respect to the conditions or scope of the invention. While the desired polymer properties can be obtained regardless of the method of preparation, provided an adequate molecular weight is attained, the continuous process outlined in Procedure B represents a practical process for the commercial production of polyamides with high terephthalic acid content. The presence of high levels of terephthalic acid renders these polymers high melting and highly viscous. Chapman, et al, U.S. Pat. No. 4,022,756, describe the extraordinary means which must be employed in order to obtain acceptable polymer with terephthalic acid contents of 60 to 80 mole percent in conventional polycondensation polymerization equipment.

The components used in the polymerization mixtures described below were polymerization grade materials including: Amoco Chemicals Corporation grade TA-33 terephthalic acid and grade IPA-99 isophthalic acid; Monsanto Corporation adipic acid and aqueous hexamethylenediamine solution which is typically about 70 weight percent HMDA in water; benzoic acid (USP);

and deionized water. The glass fibers used were ½ inch long with a diameter of about 9.7 micrometers and were supplied by Pittsburgh Plate Glass, grades PPG 3531 and PPG 3540, or similar materials.

Procedure A-13 Batch Preparation of Polyamide

Batch production of these polyamides can be carried out in one or two steps. It is convenient to carry out the process in two steps. In the first step, a polyamide of intermediate conversion is prepared in a stirred reactor which can process materials of high viscosity. For this process, feed materials consisting of the diacids (TA, IA, and AA in the desired ratios), the diamine (as commonly used herein aqueous HMDA), and any additives are charged to the reactor at about room temperature to 175° F. Water sufficient to attain a homogeneous solution before pressure letdown begins is also added. For the equipment described in the examples which follow, the water content is about 15 percent by weight. The temperature of this polymerization mixture is then raised to between about 500° F. and 600° F. as rapidly as possible. Pressure, principally steam pressure, is allowed to build to the pressure limits of said reactor (in this case, 130 psig). Once the target temperature is reached, the pressure is reduced to atmospheric pressure over a period of 5 to 120 minutes. The polymer is then allowed to flow out of the reactor by gravity or is pumped out and collected under an inert atmosphere. This polymer has an inherent viscosity (TCE/phenol) of about 0.10 dl/g to about 1.0 dl/g or greater. Preferably, the inherent viscosity is about 0.10 dl/g to about 0.40 dl/g. This polyamide of intermediate conversion is then granulated and fed to the final polycondensation section. This final polycondensation section is described below. Alternatively, if the inherent viscosity of this batch-prepared polymer exceeds about 0.8 dl/g, it can be compounded directly with the reinforcing filler materials as described in Procedure C.

When these polyamides are prepared by the above described process, and the resultant inherent viscosity is less than about 0.8 dl/g, the polyamide must be finished to an inherent viscosity of about 0.8 dl/g or greater in order to fully realize the improved properties of the instant polyamides. This finishing process is the final polycondensation step and utilizes a twin-screw extruder reactor. The twin-screw extruder allows these stiff, high melting resins to be easily handled. The screw configuration employed when the twin screw extruder is used as a polycondensation reactor consists of four basic sections. The first section is a feed section which is composed of relatively long pitches for conveying the polymerization mixture away from the feeding port. The second section is a short compression section which compresses the polymerization mixture and provides a melt seal for the reaction zone. The reaction zone comprised about 70–80 percent of the entire length of the extruder. Typically, the screw flights have relatively long pitches, but various mixing elements or kneading blocks can be included in this section. The final section is also a compression section which feeds the die. Other types of finishing reactors such as disk ring reactors, agitated stranding devolatilizers, and thin film evaporators can be utilized; however, some of these can have difficulty in handling the high viscosity of our resins.

Procedure B—Continuous Preparation of Polyamide

The dicarboxylic acids, diamine, water, and any additives are charged to the salt reactor at room temperature. The salt reactor consisted of a 5-gallon stirred tank reactor with internal coils, an oil jacket for temperature control, and a pitched-blade turbine with a variable speed drive. This reactor can accommodate a 60 g-mole charge of the polyammonium carboxylate salt components.

Once the salt reactor has been charged, it is purged with nitrogen or other inert gas and heated to 420° F. (216° C.). The pressure is set to 480 psig by first allowing the water in the salt to reach its equilibrium pressure and then adjusting with nitrogen. In the fed batch operations, the salt is subjected to a range of residence times. They average about 100 minutes. Also, as a result of the fed-batch mode of operation, it is necessary to include a second surge vessel in the salt preparation section. This vessel, which is at 420° F. (216° C.) and 450 psig, is used to isolate the salt reactor during charge addition.

Upon leaving the salt section, the salt is passed through a 140 micron filter into a two-headed positive displacement Bran-Lubbe pump. Temperature through the pump is maintained at 406° F. (208° C.). Pressures are increased to 1800 psig in the pump. After passing through the pump, the salt solution was passed through a preheat zone and heated to 622° F. (328° C.). The pressure prevents vapor formation in the preheater. Residence time in the preheater is 40 seconds.

The salt enters the flash reactor through a valve manufactured by Research Control Valve (RCV) where pressure is reduced from about 1800 psig to about 0 to 400 psig. In ordinary operation, this flash reactor is a tubular reactor about 10 to 14 feet long with an internal diameter of 0.375 to 0.5 inches. The wall temperature of this reactor is maintained at about 700° to 750° F. The necessary heat is supplied by hot oil jacket, electrical heaters, or other means. The internal temperature of this reactor is monitored along its length. The temperature of the reaction mixture is between about 525° F. and 630° F. within this reactor. The pressure within the flash reactor is controlled by a second RCV. The residence time in the flash reactor is about 10 seconds. Alternatively, this reactor may be a conventional stirred tank reactor. Example IV presents such a configuration. Specific process data for the examples using this flash reactor are presented below in Table I.

TABLE I

| | Process Conditions | | | | | | | |
|---|---|---|---|---|---|---|---|---|
| | Preheat Reactor | | | Reactor Temperature, °F. | | | | |
| Example | Temp °F. | Press Psig | GPH | ¼ | ½ | ¾ | Final | Pressure Psig |
| I | 630 | 1700 | 1.5 | 575 | 580 | 607 | 617 | 50 |
| III | 607 | 1700 | 1.75 | 515 | 544 | 562 | 578 | 60 |
| V | 640 | 1850 | 1.8 | 541 | 556 | 576 | 592 | 50 |

Upon exiting the flash reactor, the reaction mixture is injected directly onto the screws of a twin-screw extruder/reactor, the Werner-Pfleiderer ZSK-30, described in Procedure A above. As in Procedure A, the twin-screw extruder increases the molecular weight of the polymer, to provide an inherent viscosity of the finished polymer of about 0.8 dl/g or greater. The process conditions employed in the twin-screw reactor for each of the examples are presented in Table II below.

TABLE II

| | ZSK-30 Conditions | | | | | | | | | | |
|---|---|---|---|---|---|---|---|---|---|---|---|
| | Screw | | | | | | | | | | |
| | Speed | Torque | Zone Temperature, °F. | | | | | Temperature, °F. | | Product | |
| Example | Rpm | Percent | 1 | 2 | 3 | 4 | 5 | Die | Final Melt | Rate lb/hr | IV |
| I | 120 | 33 | 600 | 585 | 575 | 575 | 570 | 570 | 580 | 9.0 | 0.95 |
| III | 125 | 15 | 610 | 610 | 590 | 570 | 570 | 565 | 570 | 9.7 | 0.80 |
| V | 125 | 28 | 620 | 620 | 620 | 565 | 550 | 550 | 556 | 9.0 | 0.81 |

Procedure C—Polyamide Compounding

Two techniques are employed to prepare compounded samples for injection molding. The first of these is dry blending, which is especially convenient for the preparation of small samples. Dry blending simply involves combining weighed amounts of the resin, filler, and any other additives. These ingredients are then mixed by tumbling, stirring, etc., until the mixture is homogeneous. This dry blend can be either injection molded directly by Procedure D, or used as a feed for melt compounding.

Melt compounding involves melting the polymer resin in the presence of the filler or adding filler to the polymeric melt. This is conveniently accomplished in a twin-screw extruder, such as the above mentioned ZSK-30. The basic screw configuration used for melt compounding is composed of three sections. The first section, the feed section, has relatively long pitches for conveying the material away from the feeding port. The second section is a compression section in which the screw flights have shorter pitches. In this section, the resin is melted and further mixed with the filler. The third section is a decompression section in which the longer pitches are again used to degas the polymer melt. Advantageously, this section is vented. The polymer melt passes through a die to strand the compounded resin which is then chopped into pellets. The specific conditions employed in melt compounding the compositions of the instant invention and the comparative examples are presented in Table III below.

TABLE III

| | Compounding Conditions, ZSK-30 | | | | | | | | | |
|---|---|---|---|---|---|---|---|---|---|---|
| | Screw | | Zone Temperature, °F. | | | | | Die Temp | Product Rate | |
| Example | Speed | Torque | 1 | 2 | 3 | 4 | 5 | °F. | lb/hr | Comments |
| I | 140 | 75 | 630 | 625 | 625 | 620 | 615 | 615 | 9.5 | |
| III | 200 | 30 | 585 | 590 | 605 | 615 | 615 | 615 | 13 | w/o/nucleant |
| | 200 | 25 | 585 | 590 | 600 | 605 | 595 | 605 | 17 | w/nucleant |
| V | 90 | 41 | 535 | 600 | 600 | 600 | 600 | 600 | 17 | |
| VII | 170 | 50 | 530 | 620 | 625 | 635 | 625 | 600 | 15 | |
| X | 130 | 26 | 595 | 570 | 585 | 575 | 570 | 590 | 7.7 | 60% Fran. Fiber |
| | 140 | 30 | 650 | 650 | 645 | 635 | 635 | 620 | 18 | 40% PMF 204 |

Procedure D—Forming of Objects from the Glass Filled Compositions

The compositions of the instant invention are melt processible. Injection molding is a common technique for forming polymeric materials into useful shapes and objects. The heat distortion temperature specimens used to exemplify this invention were prepared in a 1.5 oz Arburg injection molding machine, Model 221E, in accordance with ASTM procedures.

Injection molding is an art. The precise conditions employed depend not only on the molding machine being used and the part being formed, but also on the melt viscosity of the polymeric resin and the level and nature of the fillers used. A thorough procedure of establishing an injection molding cycle is described in Nylon Plastics by Melvin I. Kohan in Chapter 5, "Injection Molding of Nylons," pp. 156–205, John Wiley & Sons, Publishers (1973) incorporated herein by reference. General conditions for injection molding of ASTM specimens on the Arburg Model 221E, injection molding machine are presented in Table IV.

TABLE IV

| | |
|---|---|
| Mold Temperature | 100° to 200° C. |
| Injection Pressure | 6,000 to 15,000 psi and held for 10 to 20 seconds |
| Back Pressure | 100 to 1,000 psi |
| Cycle Time | 20 to 60 seconds |
| Extruder | 320° to 340° C. |
| Nozzle Temperature | |
| Barrel | |
| Heated to | 270° to 370° C. |
| Screw | 20 to 60 Revolutions/minute |

The temperature of the mold was controlled. This mold temperature is cited in each example. The aforementioned procedures were employed not only for the examples which embody the present invention, but they were also employed in the preparation of comparative examples from the prior art. The examples also demonstrate that the unexpected increase in heat deflection temperature upon filling is a property of the polymer and not of the method of preparation.

EXAMPLE I

Preparation of 75/15/10-100 (TA/IA/AA—HMDA) Terpolymer

Chapman, et al, in U.S. Pat. No. 4,022,756, describe in great detail the difficulties associated with the preparation of polyamides with greater than 60 mole percent terephthalic acid. This polymeric resin containing 75 mole percent terephthalic acid was prepared by Procedure B. The charge to the salt reactor consisted of:

| Component | Amount, g |
|---|---|
| Terephthalic acid (TA) | 7401.5 |
| Isophthalic acid (IA) | 1480.3 |

-continued

| Component | Amount, g |
|---|---|
| Adipic acid (AA) | 868.1 |
| Benzoic acid (BA) | 146.6 |
| Hexamethylenediamine (HMDA) | 7112.1 |
| Water | 4300 |
| $NaH_2PO_2.H_2O$ | 13.8 |

Benzoic acid was employed to control molecular weight. The salt reactor was heated to 450° F. and maintained at a pressure of 450 psig to provide a homogeneous solution. The salt solution was then metered through a pump into the preheat zone which was maintained at about 630° F. and 1700 psig. The reaction mixture was then flashed into the tubular reactor through the RCV. Reactor pressure was maintained at 50 psig. The temperature within this flash reactor ranged from 558° F. to 623° F. The product from this flash reactor passed directly into a ZSK-30 twin-screw reactor/extruder. The temperature profile of the ZSK-30 ranged between 600° F. and 570° F., and the screw speed was 120 rpm. The overall production rate was about 9.0 lb/hr. The inherent viscosity of the product from the ZSK-30 was 0.95 dl/g. The process data are presented in Tables I and II. The heat deflection temperature of this resin at 264 psi was 260° F. when tested in accordance with ASTM method D648. The HDT specimens were prepared in accordance with Procedure D using a 250° F. mold temperature.

When compounded with 30 wt. percent glass by Procedure C and once again molded in accordance with Procedure D using a 250° F. mold temperature, the HDT at 264 psi was 502° F.

EXAMPLE II

Batch Preparation of 75/15/10 (TA/IA/AA—HMDA) Terpolyamide

The following ingredients were charged into a 10CV Helicone reactor (Atlantic Research Corp.) which was preheated to 170° F.

| Component | Amount, g |
|---|---|
| TA | 3188 |
| IA | 638.0 |
| AA | 374.0 |
| HMDA | 4326 |
| $H_2O$ | 908 |
| $NaH_2PO_2.H_2O$ | 5 |

Once charged, the polymerization mixture was heated while being agitated at about 40 rpm for about 90 minutes. During this time, the reactor pressure reached 120 psig and was controlled at this pressure. After 90 minutes, the temperature of polymerization had reached 500° F. The reactor was then vented while the melt temperature was maintained at 500° F. Once the reactor pressure had reached 0 psig, the contents of the reactor were dumped into water for cooling.

The product was ground and then dried in a forced air oven at 175° F. for 18 hours. The inherent viscosity of this polymer was 0.20 dl/g.

The polyamide of intermediate conversion was finished in the ZSK-30 twin-screw extruder reactor as outlined in Procedure A. The inherent viscosity of the finished terpolyamide was 1.16 d./g. The heat deflection temperature at 264 psi was found to be 256° F.

When this 75/15/10-100 (TA/IA/AA-HMDA) terpolyamide was dry blended with 45 wt. percent glass fiber, PPG 3531, and injection molded by Procedure D, the mold temperature was 250° F. The heat deflection temperature at 264° psi (ASTM D648) was 580° F.

EXAMPLE III

Continuous Preparation of 65/25/10 (TA/IA/AA-HMDA) terpolymer

Fourteen preparations of identical composition and similar inherent viscosity (0.8–1.0 dl/g) were prepared according to Procedure B. Three hundred pounds of these resins were blended together in a Patterson-Kelly 10 cubic foot twin-shell triblender at 20 rpm for 30 minutes.

A typical preparation of a resin for this blend was as follows. The 5 gallon salt reactor, was charged with:

| Component | Amount, g |
|---|---|
| TA | 6414.7 |
| IA | 2469.2 |
| AA | 868.1 |
| BA | 146.6 |
| HMDA | 7112.1 |
| $NaH_2PO_2.H_2O$ | 13.8 |

Once the salt reactor was charged, it was purged with nitrogen and heated to about 420° F. The pressure set point was 480 psig, and this was attained by a combination of steam pressure and nitrogen gas pressure. The salt solution was then continuously passed through the reactor system. In the preheat zone, the pressure was increased to 1800 psig and the temperature was 622° F. Residence time in the preheat zone was 40 seconds. The flash reactor was maintained at 40 psig. The temperatures within the flash reactor ranged from 525° F. to 612° F. depending upon location within the flash reactor. Residence time in the flash reactor was about 7.6 seconds. The effluent from the flash reactor was injected directly onto the screws of the extruder. The screw speed was 40 rpm. The temperature in the injection zone was 615° F., the melt temperatures were stepped down to 565° F. at the die head over the length of the extruder. Total production was 20 lbs of 0.8 dl/g polymer. The process details are summarized in Tables I and II.

When the blend of these resins was molded in accordance with Procedure D, 250° F. mold temperature, the heat deflection temperature at 264 psi was 256° F. This resin was compounded with 30 wt. percent glass fibers, PPG 3540, and molded according to the foregoing procedures. The mold temperature was varied with the following results:

| Mold Temperature, °F. | HDT, °F. |
|---|---|
| 200 | 451 |
| 250 | 481 |
| 300 | 500 |

When 1 wt. percent sodium phenylphosphinate, a nucleating agent, was added during the compounding procedure, higher heat deflection temperatures were realized at low mold temperatures.

| Mold Temperature, °F. | HDT, °F. |
|---|---|
| 200 | 471 |
| 250 | 495 |
| 300 | 498 |

EXAMPLE IV

Alternative Preparation of 65/25/10-100 (TA/IA/AA-HMDA) Terpolymer

In this example, a series of three stirred-tank reactors were employed to obtain a polycondensate with an inherent viscosity of about 0.1 to 0.2 dl/g. The high melt viscosity and high melt temperature of these polymers limited the inherent viscosity which could be obtained in the series of reactors. This low inherent viscosity material was then finished to an inherent viscosity of 1.26 dl/g in the ZSK-30 extruder/reactor.

In this process, the ingredients were charged to a 5 gallon salt reactor as in Procedure B. The charge was the same as in Example III. The salt reactor was operated at 450 psig and 450° F. The effluent from this reactor was then passed to a second reactor of similar design which was operated at 425 psig and 450° F. The effluent from this second reactor was then let down into a polycondensation reactor operated at 350 psig and 460° F. The residence time in this third reactor was 30 minutes. At the end of this time, the reactor was vented to atmospheric pressure and the solid product removed. The solid product (inherent viscosity 0.12 dl/g) was fed to the ZSK-30 twin-screw extruder/reactor. The extruder was operated at atmospheric pressure with an average barrel temperature of 670° F. The residence time in the extruder was about 2 minutes. The product inherent viscosity was 1.26 dl/g. When molded in accordance with ASTM D648 using a 250° F. mold temperature, the HDT at 264 psi was 237° F., which is 19° F. lower than for the similar composition of Example III.

When this resin was dry blended with either 30 wt. percent or 45 wt. percent glass fibers, PPG 3540, and molded using a 250° F. mold temperature, the HDT's at 264 psi were:

| Glass Fibers Percent by Weight | HDT, °F. |
|---|---|
| 30 | 509 |
| 45 | 533 |

These values are higher than in the previous example, but they are within typical variations for resins of similar compositions but different molecular weights.

EXAMPLE V

Continuous Preparation of 65/35-100 (TA/IA-HMDA) Copolymer

This material is a comparative example of a terephthalic acid containing polyamide which does not display a substantial increase in HDT when filled with 30 wt. percent glass fibers even though the mole percent terephthalic acid is identical to that of the previous two examples. The neat resin was prepared according to Procedure B.

The following charge was placed in the salt reactor:

| Component | Amount, g |
|---|---|
| TA | 6447.1 |
| IA | 3471.5 |
| BA | 73.3 |
| HMDA | 7112.1 |
| $H_2O$ | 3100 |
| $NaH_2PO_2.H_2O$ | 13.8 |

Process conditions are found in Tables I and II. The unfilled copolyamide had a heat deflection temperature at 264 psi of 253° F. when a 250° F. mold temperature was used. When this composition was compounded with 30 wt. percent glass fibers, PPG 3540, and injection molded using a 250° F. mold temperature, the HDT at 264 psi, increased only 17° F. to 270° F.

EXAMPLE VI

Batch Preparation of a 60/30/10-100 (TA/IA/AA-HMDA) Terpolyamide

The following charge was added to a 10CV helicone reactor (Atlantic Research Corp.):

| Component | Amount, g |
|---|---|
| TA | 4250 |
| IA | 2125 |
| AA | 623 |
| (70% aqueous) HMDA | 7392 |
| $H_2O$ | 1680 |
| $NaH_2PO_2.H_2O$ | 11.9 |
| Silicone oil | 12.0 |

Once charged the polymerization mixture was heated while being agitated at about 40 rpm for 105 minutes. At the end of this time the polymerization mixture had reached 585° F., and the reactor pressure had reached 120 psig and was maintained at that pressure as the melt temperature increased. Once the melt temperature reached 585° F., the reactor was vented to 0 psig over a 10 minute period. The polymer was then drained from the reactor into a water quench. The polymer was ground and then dried overnight under vacuum at about 200° F. The resin inherent viscosity was 0.95 dl/g. This resin was not evluated neat, rather it was dry blended with 30 wt. percent glass fibers, PPG 3531, and injection molded according to Procedure D. A 250° F. mold temperature was used. The heat deflection temperature at 264 psi was 257° F., very similar to that of the previous example, and approximately 224° F. lower than that of the 30 percent glass filled 65/25/10 terpolyamide of Example III.

EXAMPLE VII

Batch Preparation of 55/35/10-100 (TA/IA/AA-HMDA) Terpolyamide

The following materials were charged into the 10CV helicone reactor (Atlantic Research):

| Component | Amount, g |
|---|---|
| TA | 4112 |
| IA | 2617 |
| AA | 658 |
| HMDA | 5386 |
| $H_2O$ | 3209 |
| $NaH_2PO_2.H_2O$ | 12.0 |
| Silicone oil | 12.0 |

The polymerization mixture was heated with agitation to 575° F. This temperature was reached after 148 minutes. During this time, the reactor pressure increased to 110 psig. The reactor pressure was maintained at 110 psig until the 575° F. melt temperature was attained. The reactor pressure was then released to 0 psig over a period of 15 minutes. A nitrogen purge was introduced into the reactor and the melt temperature increased to 606° F. over a seven minute period. The polymer was then discharged into a water quench. The polymer was ground and dried in a vacuum oven at 230° F. for 16 hours. The polymer inherent viscosity was 1.08 dl/g. When molded using a 250° F. mold, the HDT at 264 psi was 225° F.

When this terpolyamide was compounded with 30 wt. percent glass, PPG 3540, according to Procedure C and injection molded using a 250° F. mold temperature, the HDT at 264 psi was 243° F. A nucleated grade of this material was also compounded. In addition to 30 wt. percent glass fibers, 1.5 wt. percent sodium phenyl phosphinate, a nucleating agent, was added during the compounding. This material was injection molded at mold temperatures of 200° and 250° F. with the following results:

| Mold Temperature, °F. | HDT, °F. |
|---|---|
| 200 | 292 |
| 250 | 267 |

The results from Examples I through VI show the advantage of the instant invention compared to the compositions disclosed in the prior art. The prior art does not teach the use of 65/35 (TA/IA-HMDA) copolymer (Example V), 60/30/10 (TA/IA-HMDA) terpolymer (Example VI), or 55/35/10 (TA/IA/AA-HMDA) terpolymer (Example VII) as glass filled injection molding compositions because these three materials are not suited for this application. The comparative results show these resins are unsuitable because the heat deflection temperature is not substantially improved by adding glass fibers to such polymeric resins. Our results show several critical parameters must be satisfied to provide a filled resin which has the advantages of the instant invention. First, the terephthalic acid component of the dicarboxylic acid mixture must be present in a mole fraction (based on total dicarboxylic acid) of 0.65 or greater as revealed by Example VII, but this criterion in and of itself is not sufficient as indicated by Example V (TA:IA of 65:35). A second requirement is that the mole ratio of isophthalic acid to adipic acid must be less than 3 to 1. Example V does not satisfy this second criterion, while the 75/15/10 composition of Examples I and II and the 65/25/10 composition of Examples III and IV do. These latter two formulations are the only two examples cited which satisfy both criteria. On the other hand, Chapman, et al, in U.S. Pat. No. 4,238,603, establish criteria for fiber resins. The compositions of Examples V through VII are similar to those cited in Example V, Table I of U.S. Pat. No. 4,238,603 as compositions which provide dimensionally stable yarns. An examination of the compositions prepared by Chapman, et al, reveals that a mole ratio of isophthalic acid units to aliphatic diacid units of three or greater is required in order to obtain a suitable fiber.

It is well known to those skilled in the art that the strength properties of conventional polyamides such as poly(hexamethylene adipamide), i.e., Nylon 6,6, are adversely affected by moisture absorbed from the environment. In Table V below, the effect of moisture on several material properties including HDT at 264 psi, are compared for a 30 wt. percent glass-fiber filled 65/25/10 (TA/IA/AA-HMDA) terpolyamide prepared as in Example III and a commerical 33 wt. percent glass-filled Nylon 6,6.

TABLE V

The Effect of Water on Polyamide Properties

| | 30% Glass Filled 65/25/10 (TA/IA/AA-HMDA) | | 33% Glass Filled Nylon 6.6 | |
|---|---|---|---|---|
| | Dry as Molded | Equilibrium Moisture | Dry as Molded | Equilibrium Moisture |
| HDT, °F. (ASTM D648) | 535 | 533 | 472 | 460 |
| Flexural Modulus | 1,300,000 | 1,310,000 | 1,170,000 | 540,000 |
| Flexural Strength (ASTM D790), psi | 39,000 | 32,500 | 39,200 | 20,100 |
| Tensile Strength (ASTM D638), psi | 29,000 | 23,300 | 26,000 | 13,400 |
| Water Absorption at Equilibrium, % | | 2.67 | | 5.99 |

The 65/25/10 TA/IA/AA-HMDA) terpolymer resin of the instant invention absorbs less moisture than Nylon 6,6 resin and is less affected by moisture plasticization. The heat deflection temperature and flexural modulus are virtually unaffected by moisture. Moreover, 20% or less of the initial tensile and flexural strengths are lost upon moisture plasticization. In contrast, the heat deflection temperature of the glass-filled Nylon 6,6 drops to 460° F., 60° below that of the glass-filled terpolyamide.

In the other strength properties, glass-filled Nylon 6,6 has lost about one-half its strength by the time equilibrium moisture levels are reached.

The following examples illustrate the use of other filler materials. While improvements in HDT at 264 psi are not as great as for glass filled compositions, improvements are still noted. These filled compositions were prepared from 65/25/10-100 (TA/IA/AA-HMDA) terpolymer prepared as in Example III. The compositions were either dry blended and compounded before molding or, in some cases, the dry blend itself was injection molded directly.

EXAMPLE VIII

In this example, mixtures of the standard glass fibers PPG 3450 and glass beads were compounded with 65/25/10 (TA/IA/AA-HMDA) terpolymer with an inherent viscosity of about 0.8 dl/g and injection molded into a 250° F. mold. The overall filler level was held constant at 33 percent by weight.

| Percent Glass Fiber | Percent Glass Beads | HDT, °F. |
|---|---|---|
| 33 | — | 501 |
| 31.3 | 1.7 | 432 |
| 29.7 | 3.3 | 452 |
| 24.7 | 8.3 | 429 |
| — | — | 245 |

EXAMPLE IX

Forty weight percent of micro-mix beads alone were compounded with 65/25/10 (TA/IA/AA-HMDA) terpolymer. The heat deflection temperature of 253° F.

was similar to the unfilled material molded under the same conditions.

EXAMPLE X

Fibrous mineral fillers were compounded with the 65/25/10-100 (TA/IA/AA-HMDA) terpolymer.

| Filler | Weight Percent | HDT, °F. |
|---|---|---|
| Wollastokup | 40 | 355 |
| Franklin Fiber | 60 | 395 |
| PMF 204 | 40 | 269 |

Improvements in heat deflection temperature were noted with Wollastokup and Franklin Fiber.

EXAMPLE XI

A 65/25/10-100 (TA/IA/AA-HMDA) terpolymer prepared using procedure A was dry blended with graphite fiber, Fortafil 3, and injection molded. The resin used had an inherent viscosity of 1.26 dl/g, and it was prepared by batch preparation procedure A. The heat deflection temperatures showed little dependence on the filler level. The results were:

| Weight Percent Graphite Fiber | HDT, °F. |
|---|---|
| 30 | 528 |
| 45 | 530 |
| 55 | 536 |

EXAMPLE XII

A 75/15/10-100 (TA/IA/AA-HMDA) terpolymer prepared using procedure A with an inherent viscosity of 1.16 dl/g was dry blended with graphite fibers, Fortafil 3, and injection molded as above. The heat deflection temperature again showed little dependence on the filler level.

| Weight Percent Graphite Fiber | HDT, °F. |
|---|---|
| 30 | 570 |
| 45 | >580 |
| 55 | 573 |

These results are superior to those obtained with glass fibers of similar levels of filler.

EXAMPLE XIII

A 75/15/10-100 (TA/IA/AA-HMDA) terpolymer prepared using procedure A (IV=1.08 dl/g) was dry blended with a combination of 25 wt. percent graphite fiber, Fortafil 3, and 25 wt. percent glass fiber, and PPG 3531. When dry blend was injection molded into a 350° F. mold, the heat deflection temperature was in excess of 580° F.

EXAMPLE XIV-A

These terpolymers can also be used as the matrix resin in laminates. These laminates were prepared by compression molding alternating layers of glass or graphite cloth with extruded films of 65/25/10 (TA/IA/AA-HMDA) terpolymer. The 0.89 dl/g inherent viscosity of a batch prepared sample of 65/25/10 terpolymer was appreciated to 1.02 dl/g by reaction in ZSK-30 twin-screw extruder reactor. A 3.5 mil film of this resin was then formed by extrusion with a low compression screw at 675° F. The composite was formed by sandwiching.

EXAMPLE XIV-B

The compositions of this invention are suitable as matrix resins for composites. Extruded films of 65/25/10-100 (TA/IA/AA-HMDA) were laminated with glass or graphite cloth and compression molded in order to obtain a composite. The matrix resin employed was a 7 ml thick film extruded from a batch prepared 65/25/10-100 (TA/IA/AA-HMDA) terpolymer with an inherent viscosity of 1.03 dl/g. The extruder used was a Brabender Plasticorder, Model EPL-V751, ¾ inch extruder (L:D=25:1). The screw was a one stage, 2.4:1 compression screw. The die used was a 6 inch horizontal slit die with an initial gap of 0.065 inches and a gap of 0.025 inches at the exit. The average barrel and die temperatures were 340° C. The screw speed was 74 rpm.

A. Laminate of 65/25/10-100 (TA/IA/AA-HMDA) with Glass Cloth

A sandwich was made from thirteen layers of the 7 mil terpolymer film which were alternated with twelve layers of glass cloth, Uniglass 7781 Um 665. The layers were about 7 inches by 13 inches. The sandwich was compression molded in a 50-ton press. The composite was formed by heating the laminated sandwich under 100 psi until the indicated temperature was reached. The pressure was then increased to the maximum indicated in the accompanying table. The laminate was then maintained at the maximum temperature and pressure for 1.5 minutes before cooling to about 400° F. and releasing the pressure. The flexural properties and horizontal shear were determined for composites molded under various conditions. The results were:

| Compression molding | | Flexural | | Horizontal |
|---|---|---|---|---|
| | | strength | modulus | shear |
| Temp. °F. | press, psi | M psi | MM psi | M psi |
| 630 | 300 | 95.0 | 4.2 | 9.3 |
| 640 | 300 | 99.5 | 3.9 | 10.3 |
| 640 | 400 | 97.4 | 3.9 | 10.4 |
| 650 | 300 | 98.7 | 4.4 | 8.2 |

B. Laminate of 65/25/10-100 (TA/IA/AA-HMDA) with Graphite Cloth

The sandwich for this composite consisted of nne layers of the 7 mil film alternated with six layers of graphite cloth. The graphite cloth was Hexcel F3T-584 which had been treated to remove the epoxy surface coating. This thirteen layer sandwich was approximately 7 inches by 13 inches in size. The sandwich was formed into a composite in much the same manner as described above except that higher pressures were required to obtain good lamination.

| Compression molding | | Flexural | | Horizontal |
|---|---|---|---|---|
| | | strength | modulus | shear |
| Temp. °F. | press, psi | M psi | MM psi | M psi |
| 630 | 600 | 130 | 9.66 | 9.76 |
| 655 | 600 | 137 | 9.87 | 9.80 |

EXAMPLE XV

It is taught in U.S. Pat. No. 4,238,603 to form fibers directly from the molten reaction mixture. Once formed, these fibers must be heat treated to crystallize them. This crystallization provides the fiber with the needed dimensional stability. Batch preparation has several drawbacks. Most evident of these are the facts that (a) the amount of fiber obtained depends directly on the size of the reactor employed; (b) the distribution of residence times of molten polymer in the reactor can lead to drastic changes in the properties of the polymer with time; and (c) batch-to-batch variations can be significant. In contrast, the resin of the present invention can be formed into fiber by remelting solidified polymer, typically in the form of pellets or granules, and continuously forming said melt into a filament. Continuous filament formation obviates the three problems cited above. Monofilaments can be prepared as follows. The process starts with a single-screw extruder to supply a melt for conversion to fiber. The monofilament is drawn at a rate of about 50 to about 200 feet/minute. At the slower draw speeds the monofilament is water quenched and subsequently reheated and drawn with a heated drawing system. At the higher melt spinning rates, the filament is drawn directly from the melt with the aid of in-line heating ovens. The properties of a 65/25/10-100 (TA/IA/AA-HMDA) and monofilament prepared from a 340° C. melt are presented in Table 6.

TABLE 6

| Draw Ratio X:1.0 | Denier g/9,000 m | Elongation Percent | Tenacity g/d | Initial Modulus g/d |
|---|---|---|---|---|
| 4.4 | 650 | 9.2 | 4.0 | 56.0 |
| 5.2 | 1050 | 21.3 | 3.6 | 54.7 |

EXAMPLE XVI

A series of terpolyamide/Nylon 6,6 blends were prepared. The Nylon 6,6 used was Zytel 101 from Du Pont Company.

The terpolyamide with a composition of 65/25/10-100 (TA/IA/AA-HMDA) was prepared using procedure A. The I.V. of the terpolyamide was 1.02 dl/g. The glass fiber used was PPG 3540 from PPG Industries. Blends of terpolyamide and Nylon 6,6 with and without glass fiber reinforcement were made by dry mixing without extrusion compounding. All materials were oven dried overnight before molding. The test bars were injection molded. Physical testing was carried out according to ASTM standard methods. Water absorption was measured 24 hours after molding. The results are shown in the table below.

TABLE 7

MATERIAL PROPERTIES OF NYLON 6,6/TERPOLYAMIDE (TPA (65/25/10) BLENDS

| Nylon TPA Ratio | Glass Fiber Percent | Tensile Strength ASTM Method D638 M psi | Tensile Elongation ASTM Method D638 Percent | Flexural Strength ASTM Method D790 M psi | Flexural Modulus ASTM Method D790 MM psi | Notched Izod ASTM D256 ft-lb/in | HDT (at 264 psi) Absorp- METHOD D648 °F. | Water tion Percent |
|---|---|---|---|---|---|---|---|---|
| 100/0 | 0 | 9.07* | 72.5* | 15.1 | 0.35 | 0.8 | 163 | 0.89 |
| 100/0 | 45 | 32.8 | 5.1 | 51.7 | 1.64 | 4.5 | 472 | 0.50 |
| 100/0 | 60 | 37.4 | 5.2 | 58.2 | 2.16 | 5.1 | 476 | 0.36 |
| 80/20 | 0 | 11.8 | 4.9 | 17.3 | 0.41 | 0.5 | 179 | 0.84 |
| 80/20 | 45 | 32.2 | 4.9 | 49.5 | 1.55 | 3.9 | 485 | 0.42 |
| 80/20 | 60 | 41.1 | 5.6 | 60.0 | 2.36 | 4.8 | 490 | 0.30 |
| 60/40 | 0 | 12.7 | 4.5 | 18.9 | 0.45 | 0.7 | 225 | 0.67 |
| 60/40 | 45 | 34.7 | 5.0 | 47.5 | 1.50 | 4.0 | 489 | 0.35 |
| 60/40 | 60 | 42.0 | 5.3 | 63.9 | 2.42 | 4.5 | 493 | 0.25 |
| 40/60 | 0 | 11.8 | 3.7 | 19.8 | 0.52 | 0.7 | 205 | 0.52 |
| 40/60 | 45 | 31.8 | 4.6 | 46.8 | 1.56 | 3.7 | 520 | 0.28 |
| 40/60 | 60 | 39.1 | 4.4 | 62.6 | 2.37 | 4.6 | 517 | 0.20 |
| 20/80 | 0 | 8.7 | 2.4 | 24.0 | 0.56 | 0.7 | 223 | 0.36 |
| 20/80 | 45 | 32.0 | 4.2 | 49.5 | 1.75 | 3.1 | 543 | 0.22 |
| 20/80 | 60 | 38.4 | 4.7 | 64.6 | 2.52 | 4.6 | 553 | 0.22 |
| 0/100 | 0 | 12.6 | 3.9 | 20.3 | 0.53 | 0.8 | 230 | 0.56 |
| 0/100 | 45 | 37.7 | 5.2 | 48.6 | 1.61 | 3.4 | 565 | 0.29 |
| 0/100 | 60 | 40.2 | 4.8 | 59.0 | 2.43 | 4.9 | 578 | 0.21 |

*This sample had yield strength 10,500 psi, yield elongation 5.0 percent.

(TA/AA-HMDA Copolymers

Copolymers of hexamethylenediamine with adipic acid and terephthalic acid are well known in the prior art, especially as fibers for textile use. Incorporation of terephthalic acid into the polymer improves the melt strength, an important consideration in melt spinning, without adversely affecting the textile properties. However, above a mole ratio of terephthalic acid to adipic acid of about 0.18, the polymer melting point becomes too high to be useful in melt spinning. Injection molding compositions of hexamethylenediamine and terephthalic acid and adipic acid with a TA/AA mole ratio of less than about 0.50 have mechanical properties which are inferior to those of Nylon 6,6. The effect of composition on the heat deflection temperature at 264 psi for various copolymer compositions is presented in the Table below:

| TA/AA mole ratio | HDT, °F. |
|---|---|
| 0/100 (Nylon-6,6) | 170 |
| 30/65 | 167 |
| 50/50 | 181 |
| 60/40 | 203 |
| 75/25 | 384 |

Poly(hexamethylene terephthalamide) melts with decomposition at about 700° F., and, as a result, it is not useful in injection molding applications. In contrast, the filled polymers of the instant invention in which the TA:AA mole ratio of 0.65 or greater have an HDT in excess of glass-filled Nylon-6,6, and the filled resins are less sensitive to moisture plasticization than is Nylon-6,6. These features are illustrated by the resins prepared in Examples XVII and XVIII. For comparison, a commerical Nylon-6,6 (DuPont Zytel 101) was dry blended with equivalent weights of glass fiber and injection molded on the some molding machine under similar conditions. These results are summarized in Table 8.

TABLE 8

| TA/AA Mole Ratio | Glass Fiber Percent | Water Immersion Time Hour | Tensile Strength ASTM Method D638 M psi | Tensile Elongation ASTM Method D638 Percent | Flexural Strength ASTM Method D790 M psi | Flexural Modulus ASTM Method D790 M psi | Notched Izod ASTM Method D256 ft-lb/in | Tensile Impact Strength ft-lb/in$^2$ | HDT (at 264 psi) ASTM METHOD D648 °F. | Water Absorption Percent |
|---|---|---|---|---|---|---|---|---|---|---|
| 0/100 | 0 | 0 | 11.9 | 12.8 | 17.5 | 397 | 0.9 | 95 | 155 | |
| | | 24 | 9.2 | 277 | 15.5 | 276 | 1.4 | 90 | 165 | 1.38 |
| | | 1000 | 8.0 | 433 | | 88.2 | NB | NB | 146 | 6.7 |
| | 30 | 0 | 26.0 | 4.6 | 51.2 | 1170 | 2.0 | 58 | 472 | |
| | | 24 | 24.8 | 5.6 | 35.9 | 1000 | 2.6 | 87 | 469 | 0.87 |
| | | 1000 | 15.0 | 4.8 | 22.5 | 591 | 4.5 | 88 | 443 | 4.47 |
| | 45 | 0 | 33.0 | 5.5 | 50.3 | 1840 | 3.4 | 97 | 493 | |
| | | 24 | 32.1 | 5.8 | 46.3 | 1380 | 3.8 | 135 | 484 | 0.65 |
| | | 1000 | 20.9 | 4.9 | 29.1 | 954 | 5.0 | 118 | 480 | 3.31 |
| 60/40 | 0 | 0 | 12.9 | 4.1 | 20.4 | 475 | 0.8 | 32 | 203 | |
| | | 24 | 11.2 | 3.7 | 19.6 | 437 | 0.7 | 43 | 211 | 0.63 |
| | | 1000 | 5.0 | 2.1 | | 240 | 1.4 | 31 | 180 | 2.86 |
| | 30 | 0 | 22.3 | 3.5 | 36.8 | 1310 | 1.6 | 30 | 563 | |
| | | 24 | 19.8 | 3.2 | 32.3 | 1170 | 1.6 | 45 | 557 | 0.43 |
| | | 1000 | 17.3 | 3.2 | 20.1 | 862 | 1.6 | 46 | 550 | 2.27 |
| | 45 | 0 | 34.0 | 4.6 | 50.6 | 1840 | 2.8 | 82 | 571 | |
| | | 24 | 29.0 | 3.9 | 47.0 | 1760 | 2.9 | 93 | 576 | 0.33 |
| | | 1000 | 24.9 | 4.2 | 37.1 | 1320 | 2.5 | 99 | 567 | 1.70 |
| 75/25 | 0 | 0 | 12.1 | 3.3 | 23.1 | 55 | 0.8 | | 38.1 | |
| | | 24 | | | | | | | | |
| | 30 | 0 | | | | | | | | |
| | | 24 | | | | | | | | |
| | 45 | 0 | 31.9 | 4.3 | 464 | 1890 | 3.5 | | 580 | |
| | | 24 | | | | | | | | |

EXAMPLE XVII

Batch Preparation of 60/40 (TA/AA-HMDA) Copolymer 7,238 grams of a solution of HMDA in water (70.8% HMDA), 4,250 grams of TA, 2,493 grams of AA, 11.85 grams of sodium hypophosphite, 11.85 DC200 silicone oil as defoaming agent, and an additional 1,678.9 grams of deionized water were loaded into the 10 CV Helicone reactor, which was preheated to about 170° F. After the loading, the melt temperature was slowly increased to about 590° F. in a period of about 108 minutes while the agitator was running at about 40 rpm. The pressure in the reaction increased to 120 psi and was controlled at about 10 psi as the melt temperature increased. At the time, melt temperature reached 590° F., the reactor pressure was vented down to atmosphere pressure in a period of about 16 minutes. Then the polymer in the reactor was dumped into water for cooling. The cooled polymer was then ground, dried ion a vacuum oven at 220° F. overnight, and was ready for injection molding. The I.V. of this polymer was 0.90 dl/g.

EXAMPLE XVIII

Batch Preparation of 75/25 (TA/AA-HMDA) Copolymer 4,410 grams of a solution of hexamethylene diamine in water (70.8% HMDA), 3,188 grams of terephthalic acid and 935 grams of adipic acid were charged into a helicone mixer (model 10CV, Atlantic Research Corp.), 3.6 grams of sodium hypophosphite was added as a heat stabilizer and to increase the rate of reaction. 31 grams of benzoic acid was added for molecular weight control. 7 grams of silicone oil was added to reduce foaming. The helicone mixer was sealed and the batch temperature was increased to 394° F. over a period of 80 minutes while stirring. The pressure increased to 118 psig and was controlled at approximately 118 psig for 45 minutes while the batch temperature was increased to 497° F. At this point the pressure was reduced to 100 psig and controlled at 100 psig for a period of 11 minutes. The pressure was then reduced to atmospheric by venting over a period of three minutes. The batch temperature was then 580° F. The polymer was removed from the mixer and quenched in water. The polymer was ground, dried and fed into an extruder (Model ZSK30, Werner and Pfleiderer) for further polycondensation. The resulting polymer had an inherent viscosity of 1.06 dl/g.

We claim:

[1. A resinous polyamide comprising the following recurring units:

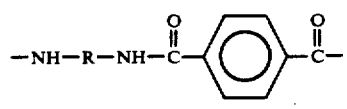

(A)

and

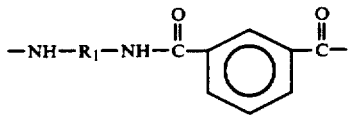

(B)

and

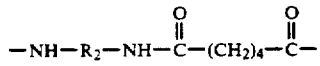

(C)

wherein the mole ratio of the dicarboxylic acid moieties in the A:B:C units is about 65-90:25-0:35-5 with the proviso that the mole ratio of the dicarboxylic acid moieties in the B:C units is less than 3:1 and wherein R, $R_1$, and $R_2$ are, independently, divalent aliphatic hydrocarbyl radicals of 2 to 14 carbon atoms.]

[2. The polyamide of claim 1 wherein the mole ratio of the acid moieties in said A:B:C units is about 65–80:-25–5:15–10.]

[3. The polyamide of claim 1 wherein the mole ratio of said acid moieties in said A:B:C units is about 65:25:10 to about 75:15:10.]

[4. The polyamide of claim 1 wherein R, $R_1$, and $R_2$ are hexamethylene with the formula $(CH_2)_6$.]

[5. A molded object comprising the polyamide of claim 1.]

[6. A fiber comprising the polyamide of claim 1.]

[7. A laminate comprising the polyamide of claim 1.]

[8. A filled composition comprising 90 to 40 parts by weight of the polyamide of claim 1 and 10 to 60 parts by weight of mineral fiber.]

9. A filled injection moldable polyamide composition wherein said polyamide comprises the following recurring units:

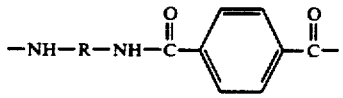

(A)

and

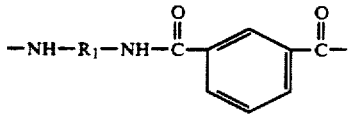

(B)

and

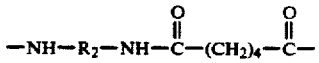

(C)

wherein the mole ratio of the dicarboxylic acid moieties in the A:B:C units is about 65–90:25–0:35–5 with the proviso that the mole ratio of the dicarboxylic acid moieties in the B:C units is less than 3:1, wherein R, $R_1$ and $R_2$ are, independently, divalent aliphatic hydrocarbyl radicals of 2 to 14 carbon atoms, wherein about 10 to about 60 percent by weight of the filled composition comprises a filler selected from the group consisting of glass fibers[, glass beads, or] *and* graphite fibers [or mixtures of the same] and wherein the filled polyamide composition has a heat deflection temperature *determined by ASTM Method D648* in excess of about 245° C. *after being injection molded using a mold temperature of 250° F.*

10. The composition of claim 9 wherein the filler comprises about 30 to about 60 percent by weight of the filled composition.

11. The filled injection moldable polyamide composition of claim 9 wherein the mole ratio of the dicarboxylic acid moieties in the A:B:C units is about 65–80:-25–5:15–10.

12. The composition of claim 11 wherein said filler comprises about 30 to about 60 percent by weight of said composition.

13. The composition of claim 9 wherein said mole ratio of the dicarboxylic acid moieties in the A:B:C units is about 65:25:10 to about 75:15:10 and said filler comprises about 30 to about 60 percent by weight of said composition.

14. The composition of claim 9 wherein said R, $R_1$, and $R_2$ are hexamethylene.

15. The composition of claim 13 wherein said R, $R_1$, and $R_2$ are hexamethylene of the formula $(CH_2)_6$.

16. The composition of claim 9 in the form of a molded article or a laminate.

[17. A crystalline polyamide copolymer consisting essentially of the following recurring units:

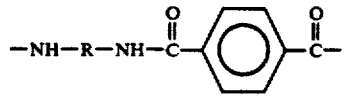

(I)

and

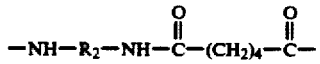

(II)

wherein the mole ratio of dicarboxylic acid moieties in I:II is about 65:35 to 95:5, wherein R and $R_2$ are aliphatic hydrocarbyl radicals of 2 to 14 carbon atoms.]

[18. A molded article comprising the polyamide copolymer of claim 17.]

[19. A fiber comprising the polyamide copolymer of claim 17.]

[20. A laminate comprising the polyamide copolymer of claim 17.]

[21. The polyamide copolymer of claim 17 wherein R and $R_2$ are hexamethylene of the formula $(CH_2)_6$.]

[22. A filled composition comprising about 90 to 40 parts by weight of the polyamide copolymer of claim 17 and about 10 to about 60 parts by weight of a mineral fiber.]

23. A filled injection moldable polyamide copolymer composition, said copolymer comprising the following recurring units:

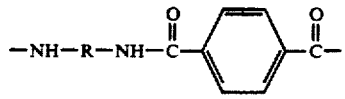

(I)

and

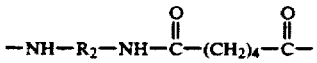

(II)

wherein the mole ratio of the dicarboxylic moieties in I:II is about 65:35 to 95:5, wherein R and $R_2$ are aliphatic hydrocarbyl radicals of 2 to 14 carbon atoms, and wherein about 10 to about 60 percent by weight of the filled composition comprises a filler selected from the group consisting of glass fibers[, glass beads, or] *and* graphite fibers, [or mixtures of the same] and wherein the filled copolymer has a heat deflection temperature *determined by ASTM Method D648* in excess of about 245° C. *after being injection molded using a mold temperature of 250° F.*

24. The composition of claim 23 wherein said filler comprises about 30 to about 60 percent by weight of said composition.

[25. The composition of claim 21 wherein R and $R_2$ are hexamethylene of the formula $(CH_2)_6$.]

26. A blend comprising the composition of claim [1] 9 and nylon 6,6 wherein said nylon 6,6 comprises from about 1 to about 99 weight percent of the blend.

[27. A blend comprising the copolymer of claim 17 and nylon 6,6 wherein said nylon 6,6 comprises from about 1 to about 99 weight percent of the blend.]

28. A process for preparing a polyamide composition having a heat deflection temperature of at least about 245° C., said process comprising compounding about 90 to about 40 parts by weight of a polyamide with about 10 to about 60 parts by weight of a filler, said polyamide comprising the following recurring units:

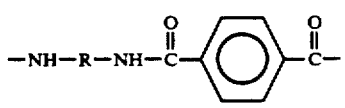

(A)

and

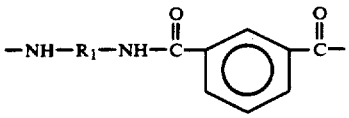

(B)

and

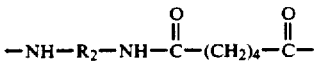

(C)

wherein the mole ratio of the dicarboxylic acid moieties in the A:B:C units is about 65-90:25-0:35-5 with the proviso that the mole ratio of the dicarboxylic acid moieties in the B:C units is less than 3:1, and wherein R, $R_1$, and $R_2$ are, independently, divalent aliphatic hydrocarbyl radicals of 2 to 14 carbon atoms, and wherein said filler is selected from the group consisting of glass fibers, [glass beads, or graphite fibers] or mixtures of the same.

29. The process of claim 28 wherein R, $R_1$, and $R_2$ are hexamethylene of the formula $(CH_2)_6$.

[30. A crystalline injection moldable polyamide copolymer having a heat deflection temperature of at least about 245° C. when molded and filled with glass fibers, glass beads or graphite fibers comprising the following recurring units:

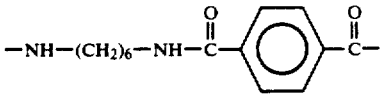

(A)

and

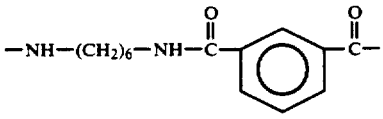

(B)

and

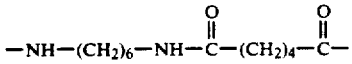

(C)

wherein the mole ratio of A:B:C units is about 65-90:-25-5:30-5.]

*31. A composition comprising a polyamide copolymer and up to about 60 wt % of at least one filler selected from the group consisting of glass fiber and graphite fibers, said copolymer comprising the following recurring units:*

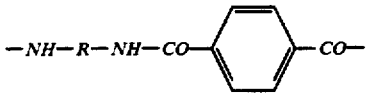

*—NH—R—NH—CO—(CH₂)₄—CO—,*

*wherein R and $R_2$ are aliphatic hydrocarbyl radicals of 2 to 14 carbon atoms, and wherein the said copolymer, after being filled with glass fibers and injection molded using a mold temperature of 250° F. has a heat deflection temperature determined by ASTM Method D648 above about 245° C.*

*32. The filled polyamide copolymer composition of claim 31 wherein the said heat deflection temperature determined by ASTM Method D648 is in the range about 245° C. to 305° C.*

*33. The filled polyamide copolymer composition of claim 31 wherein said copolymer comprises the following recurring units:*

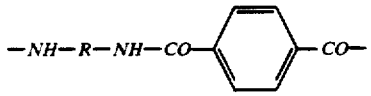

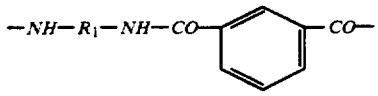

*—NH—R₂—NH—CO—(CH₂)₄—CO—*

*wherein R, $R_1$ and $R_2$ are aliphatic hydrocarbyl radicals of 2 to 14 carbon atoms.*

*34. The filled polyamide copolymer composition of claim 31 wherein R and $R_2$ are —$(CH_2)_6$—.*

*35. The filled polyamide copolymer composition of claim 31 wherein said copolymer comprises the following recurring units:*

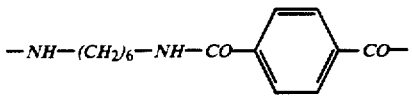

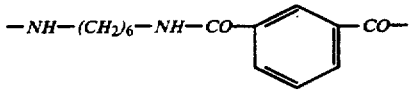

*—NH—(CH₂)₆—NH—CO—(CH₂)₄—CO—.*

*36. The filled polyamide copolymer composition of claim 31 comprising up to 60 wt % of at least one filler selected from the group consisting of glass fiber and graphite fiber, said fiber being i the form of cloth.*

*37. A composition comprising a polyamide copolymer and up to about 60 wt % of at least one filler selected from the group consisting of glass fiber, and graphite fibers, said copolymer comprising the following recurring units:*

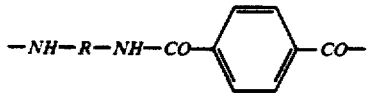

$$-NH-R_2-NH-CO-(CH_2)_4-CO-,$$

*wherein the mole ratio of the dicarboxylic acid moieties terephthalic acid: adipic acid in the copolymer is at least 0.65, and wherein R and $R_2$ are aliphatic hydrocarbyl radicals of 2 to 14 carbon atoms, said copolymer filled with glass fibers having a heat deflection temperature determined by ASTM Method D648 above about 245° C. after being injection molded using a mold temperature of 250° F.*

*38. The filled polyamide copolymer composition of claim 37, wherein R and $R_2$ are $-(CH_2)_6-$.*

*39. The filled polyamide copolymer composition of claim 37 wherein said copolymer comprises the following recurring units:*

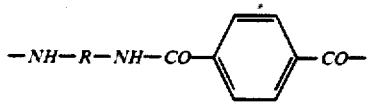

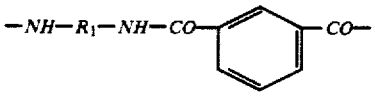

$$-NH-R_2-NH-CO-(CH_2)_4-CO-$$

*wherein R, $R_1$ and $R_2$ are aliphatic hydrocarbyl radicals of 2 to 14 carbon atoms.*

*40. The filled polyamide copolymer composition of claim 37 wherein said copolymer comprises the following recurring units:*

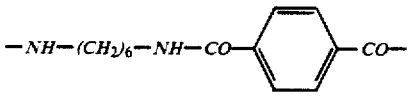

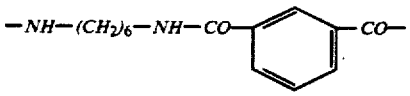

$$-NH-(CH_2)_6-NH-CO-(CH_2)_4-CO-$$

*41. A molded polyamide copolymer article, said copolymer comprising the following recurring units:*

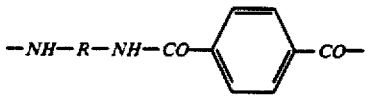

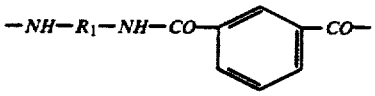

$$-NH-R_2-NH-CO-(CH_2)_4-CO-$$

*wherein R, $R_1$ and $R_2$ are aliphatic hydrocarbyl radicals of 2 to 14 carbon atoms, the proportion of the dicarboxylic acid moiety terephthalic acid is at least 55 mole % based on total dicarboxylic acid moieties in the copolymer, and said copolymer filled with glass fibers has a heat deflection temperature determined by ASTM Method D648 above about 245° C. after being injection molded using a mold temperature of 250° F.*

*42. A filled composition comprising up to about 60 wt % of at least one filler selected from the group consisting of glass fiber and graphite fiber and a polyamide copolymer comprising the following recurring units:*

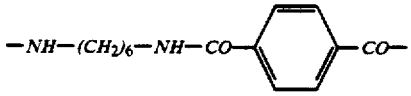

$$-NH-(CH_2)_6-NH-CO-(CH_2)_4-CO-$$

*said filled composition having a heat deflection temperature determined by ASTM Method D648 above about 245° C. when injection molded using a mold temperature of 250° F.*

*43. The filled composition of claim 42 wherein the mole ratio of the dicarboxylic acid moieties terephthalic acid: adipic acid in the copolymer is at least 0.65.*

*44. The filled composition of claim 42 wherein said copolymer comprises the following recurring units:*

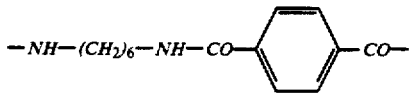

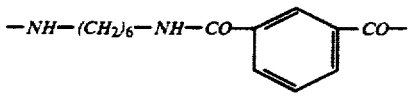

$$-NH-(CH_2)_6-NH-CO-(CH_2)_4-CO-.$$

* * * * *